No. 696,550. Patented Apr. 1, 1902.
J. D. COX & F. A. ODIN.
CAN SOLDERING MACHINE.
(Application filed Jan. 18, 1901.)
(No Model.) 5 Sheets—Sheet 5.
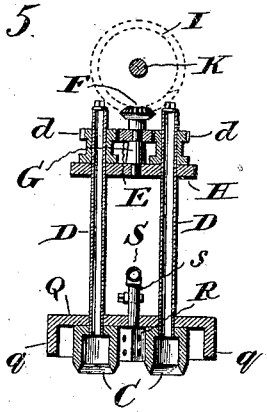
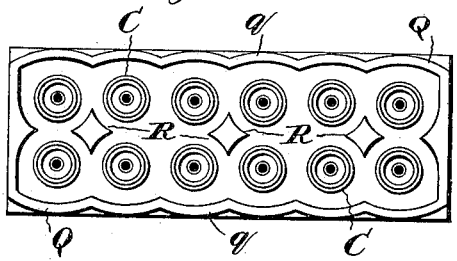
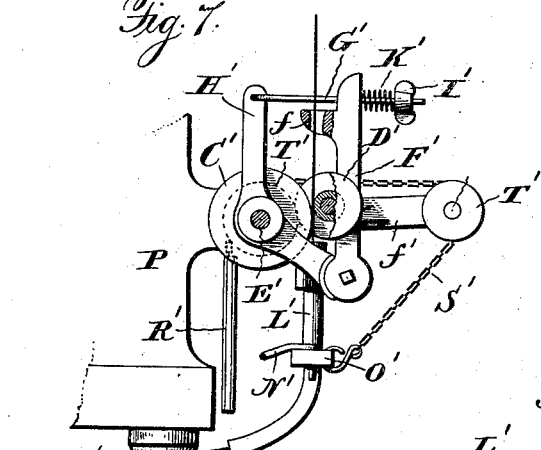
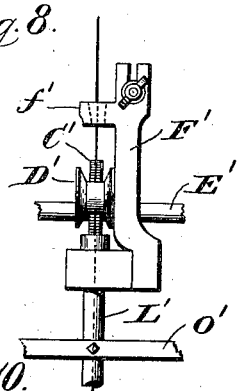
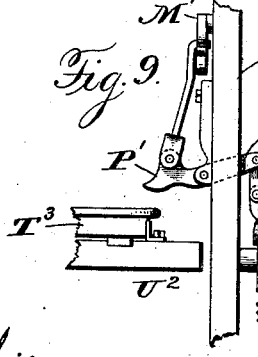
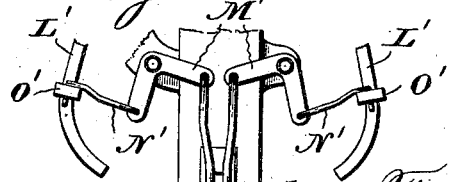
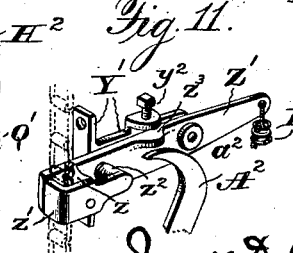
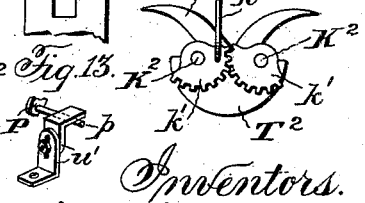
Witnesses:
Jas. E. Hutchinson.
Henry C. Hazard.
Inventors.
James D. Cox and Frank A. Odin,
by Crindle and Russell, their Attys.
THE NORRIS PETERS CO., PHOTO-LITHO., WASHINGTON, D. C.

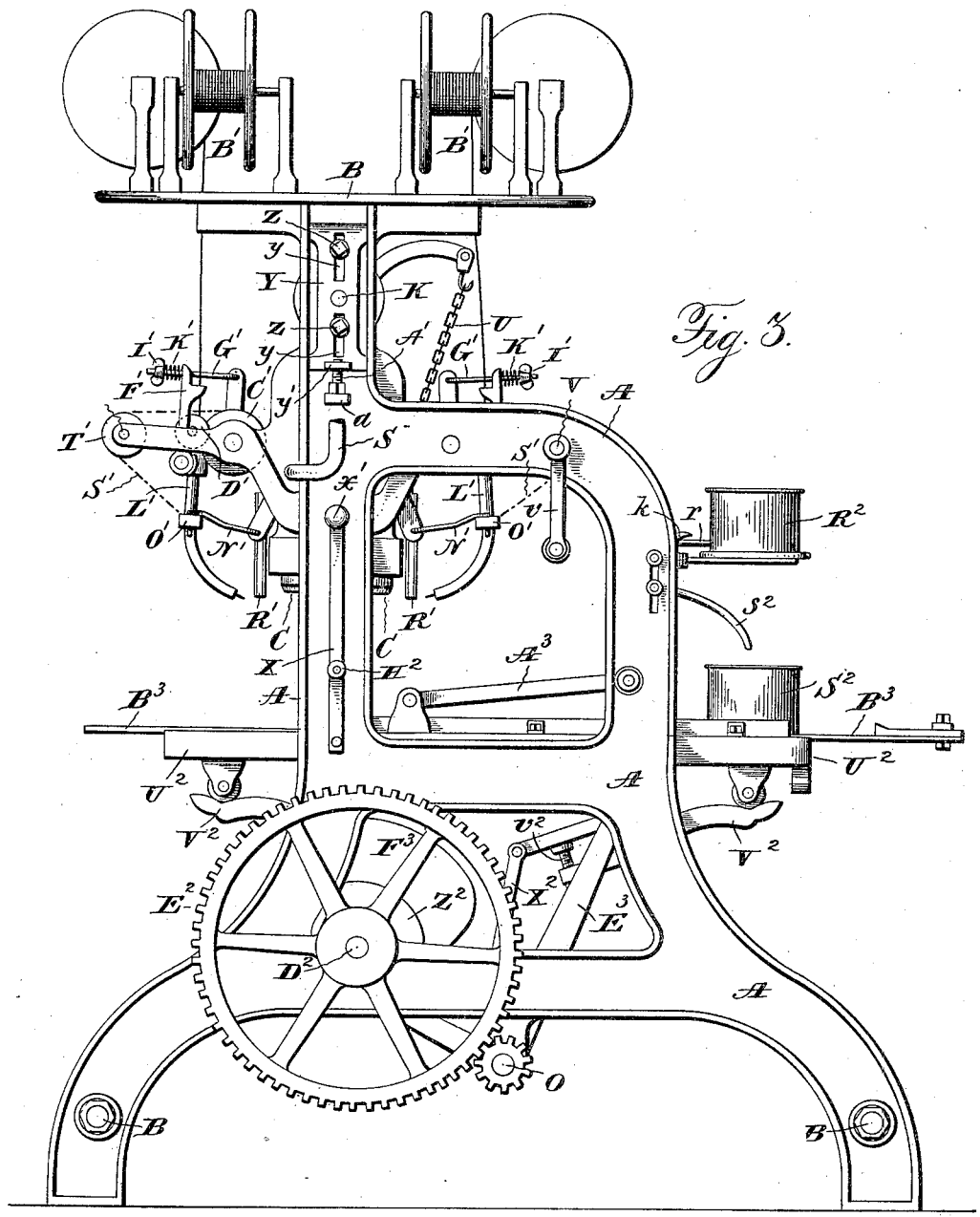

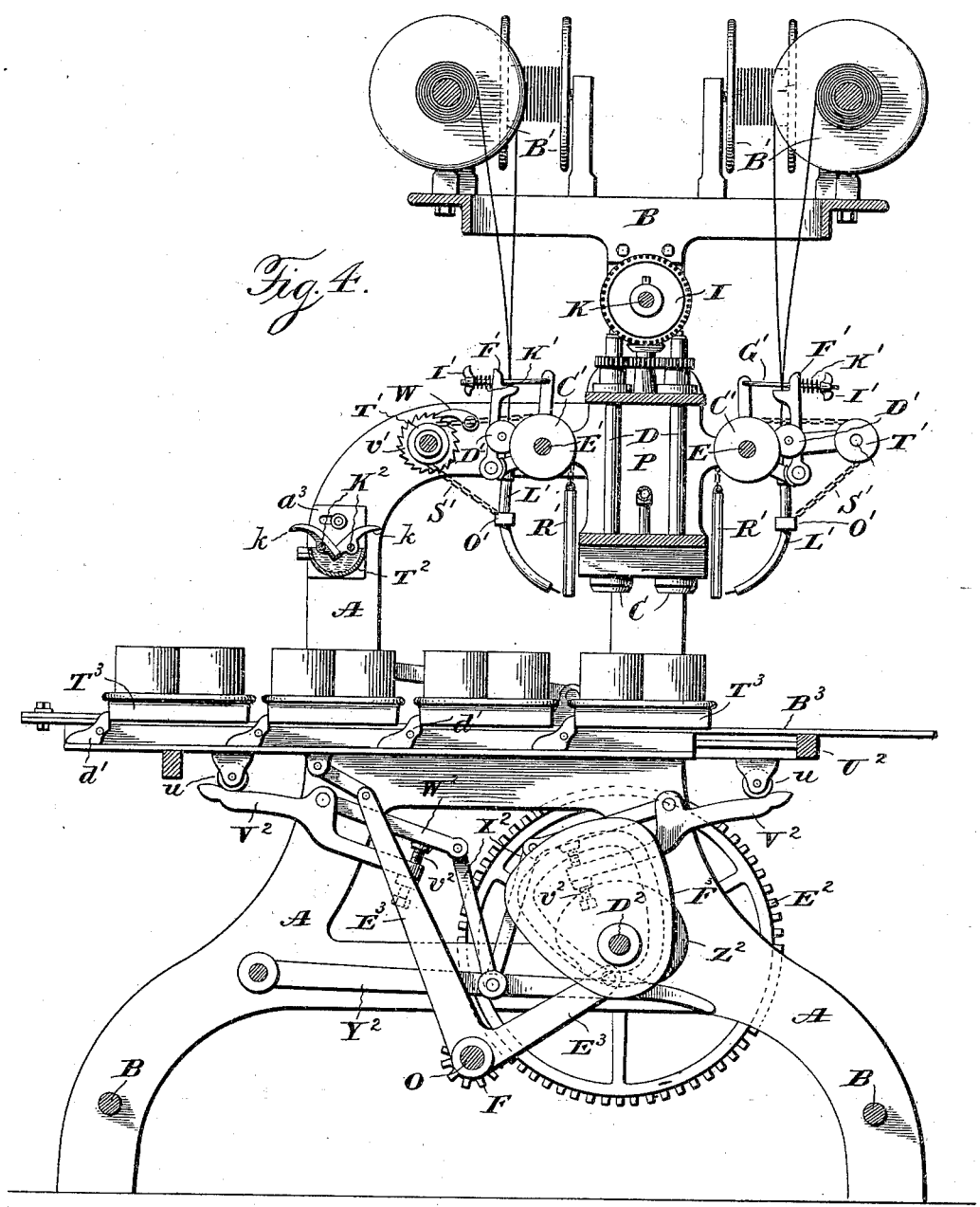

UNITED STATES PATENT OFFICE.

JAMES D. COX AND FRANK A. ODIN, OF BRIDGETON, NEW JERSEY; SAID ODIN ASSIGNOR TO COX BROTHERS & COMPANY, OF BRIDGETON, NEW JERSEY.

CAN-SOLDERING MACHINE.

SPECIFICATION forming part of Letters Patent No. 696,550, dated April 1, 1902.

Application filed January 18, 1901. Serial No. 43,794. (No model.)

*To all whom it may concern:*

Be it known that we, JAMES D. COX and FRANK A. ODIN, of Bridgeton, in the county of Cumberland, and in the State of New Jersey, have invented certain new and useful Improvements in Can-Soldering Machines; and we do hereby declare that the following is a full, clear, and exact description thereof, reference being had to the accompanying drawings, in which—

Figure 1:
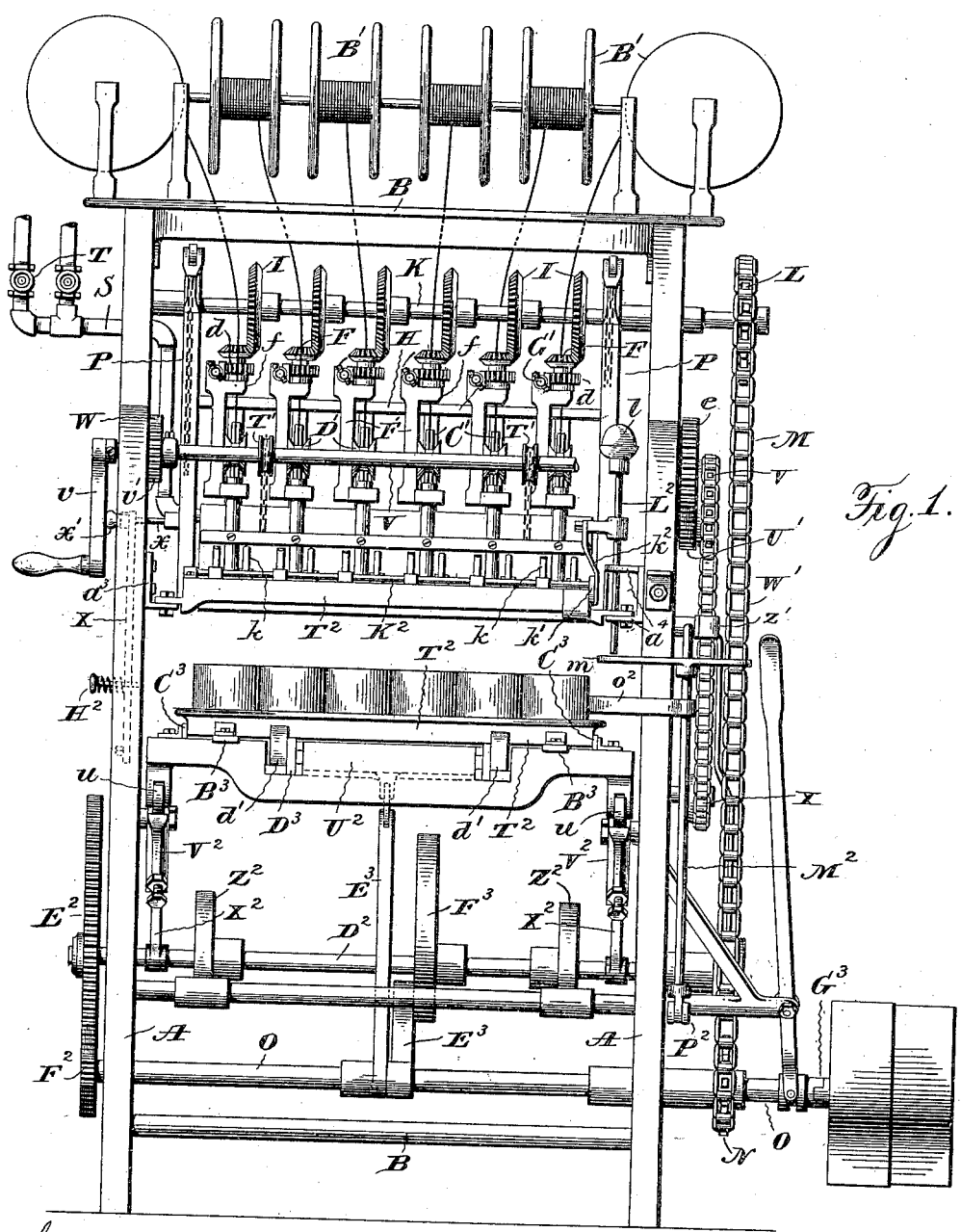
Figure 2:
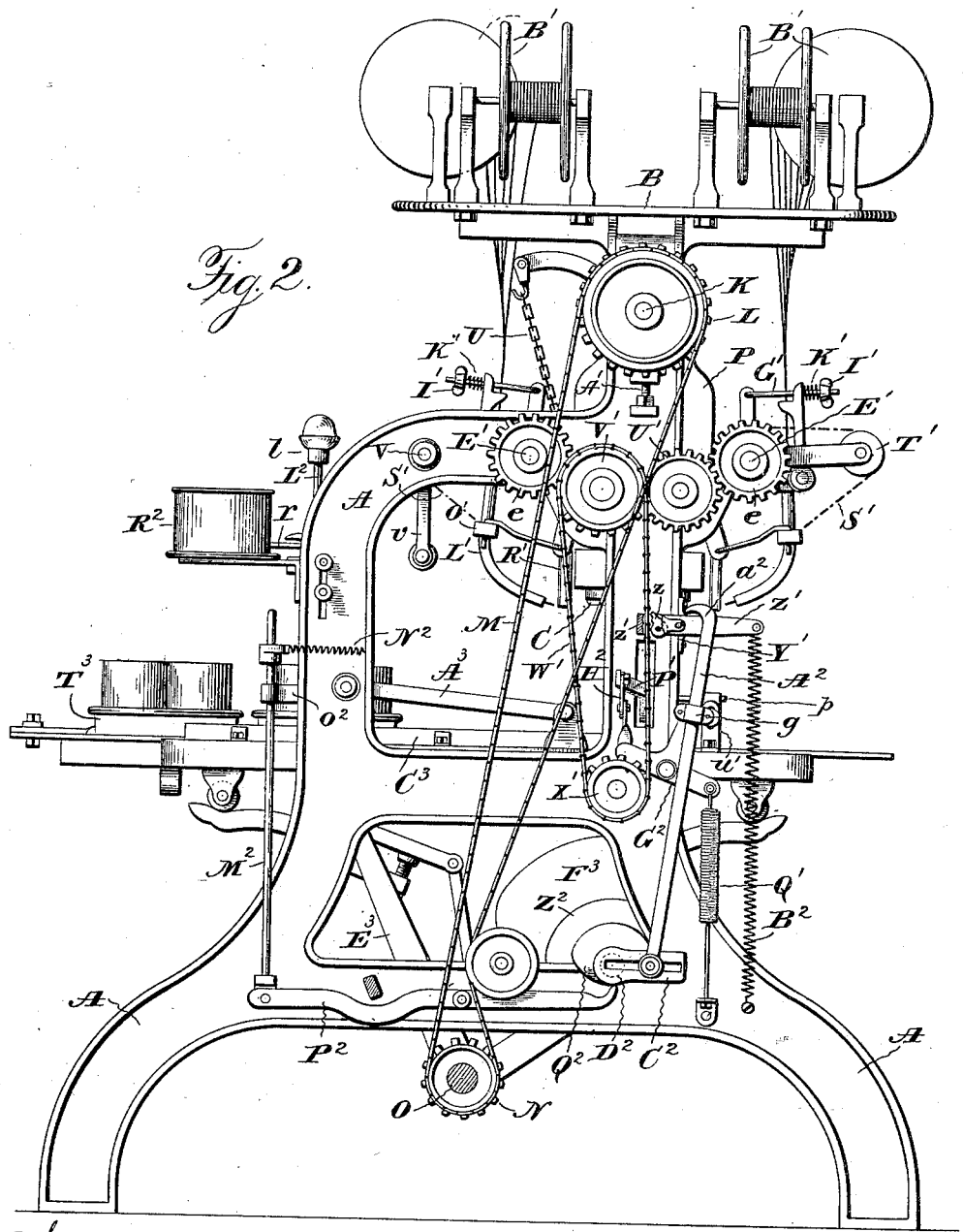

Figure 1 is a front elevation of the machine. Figs. 2 and 3 are respectively elevations of opposite sides; Fig. 4, a section on the line $x\,x$ of Fig. 1; Fig. 5, a detail view, in vertical section, of the soldering mechanism; Fig. 6, a detail bottom plan view thereof. Figs. 7 and 8 are respectively detail views of the solder-feeding mechanism. Figs. 9 and 10 are respectively detail views of the devices for moving the solder-guiding tubes to and from the soldering-tools and for controlling the feed of the solder. Fig. 11 is a detail view in perspective of the said feeding devices; and Fig. 12 is a detail view, in end elevation, of the acid-applying mechanism.

Letters of like name and kind refer to like parts in each of the figures.

The object of this invention is to provide a power-machine for soldering caps on cans whose various movements will be automatic, which will have capacity for a large amount of work, and yet be comparatively simple and inexpensive; and to these ends said invention consists in the machine and in the parts thereof combined substantially as hereinafter specified.

Briefly stated, the machine comprises a movable table or support for the cans to be capped, mechanism for supplying suitable acid or flux to the cans, soldering-tools, and means for supplying solder to the latter. The frame of the machine is composed of two similar sides A and A, that are suitably connected together by rods or bars B and B, one of which is at the top. The soldering-tools C and C are arranged in two parallel gangs or rows, each being mounted on the lower end of a rod or spindle D, on which is fastened a pinion $d$, that in common with the pinion $d$ of the opposite soldering-tool of the other row meshes with and receives motion from a pinion E, that is connected with the hub of a bevel-pinion F. The latter and the pinion E are journaled on a vertical shaft G, which is fastened to a horizontal plate H, that forms part of a frame in which the soldering-tools are mounted. The bevel-pinion F is in mesh with and is driven from a like pinion I upon a horizontal shaft K, that is journaled in bearings in the frame sides A and A, one end of said shaft having mounted on it a sprocket-wheel L, that is connected by a chain M with a sprocket-wheel N on the driving-shaft O, journaled in bearings in the frame sides A and A, near the bottom of the latter.

The frame supporting the soldering-tools C and C has two side pieces P and P, that are pivoted at their upper ends to the shaft K, while to their lower ends is attached the furnace, consisting of a horizontal plate Q, with a depending flange $q$, which surrounds the gangs of tools C and C and gas-burners R and R. The latter are arranged so that one is centered between and heats four soldering-tools, each burner being attached to a valved branch pipe $s$, that is connected to a main pipe S, which has communication with a suitable supply of gas. A valve T in the main pipe S enables the flow of gas to all of the burners to be controlled at once, while any required regulation of the burners separately can be effected by the valves in the branches $s$ and $s$.

The frame carrying the soldering-tools is pivoted to the shaft K in order that the tools may be swung into such position as to give access to them for cleaning, retinning, or replacement. Chains U and U, connected, respectively, at one end to the frame sides P and P and at the other end to a shaft V, upon which they may be wound by means of a crank $v$, enable the frame and tools to be swung as described. The shaft V is provided with a ratchet-wheel $v'$ for engagement by a dog W to enable the frame and tools to be secured in the position to which they may be swung. By disengaging the dog the frame will swing to place the tools in normal operating position. For locking the frame in the latter position there is provided a spring-bar X, which is fastened at one end to one of the side frames A and has at its free end a pin $x$, which passes through an opening in said frame and enters a hole in the side of one of the pieces P. On the spring-bar X is a knob $x'$, by which the bar may be moved to free the pin from the plate Q.

It will be apparent that by the construction described access to the soldering-tools can be had without putting out the fires or stopping the machine.

To enable the soldering-tools to be adjusted vertically, the bearings of the shaft K are formed each in a vertically-movable block Y, which is secured to the outer side of a frame side A by bolts Z and Z, passing through vertical slots $y$ and $y$ in the block. The vertical position of the block is fixed by means of an adjusting-screw A', that is tapped through a lug $y'$, projecting horizontally from the block Y, and has its head abutting against a lug $a$, projecting horizontally from the frame side A.

The solder for the tools C and C is in the form of wire wound on reels or spools B' and B' on a plate, which connects the two frame sides A and A, there being a reel or spool for each tool. From the reel the wire passes to guiding and feeding mechanism, by which it is carried in just the proper quantity to the soldering-tool. The feeding mechanism consists of two oppositely-arranged rollers C' and D', the former having a toothed or roughened periphery and being mounted on a shaft E', journaled in bearings on the frame sides A and A, and the other having a smooth periphery with inclined sides and journaled in bearings on a pivoted bar F', by the adjustment of which the pressure or grip of the two rollers on the wire may be regulated. A short rod G', pivoted at one end to a bar H', that is fixed relative to the bar F', and passing through an open-ended slot in the top of the bar F', and a thumb-nut I' on said rod G', between which and the side of the bar F' is a coiled spring K', constitute suitable means for such adjustment of the grip or pressure. Before passing between the rollers the wire goes through a guiding-eye $f$ on the bar F', and from said rollers the wire passes into and through a guide-tube L', whose lower end is turned horizontally to direct the wire against the side of the soldering-tool C. The upper end of the tube L' is secured to an eye at the lower end of the bar H', and as the latter is pivotally mounted on the shaft E' the guide-tube is capable of having its lower end moved toward and from the soldering-tool. Thus as soon as the requisite quantity of solder has been fed to the tool the tube is moved away from near the tool to a point where it cannot be affected by the heat of the tool and the solder within it melted, causing waste thereof and an insufficient supply to succeeding cans, so that the latter are defectively sealed. The means for producing this movement of the guide-tubes consist of a bell-crank lever M', pivoted to one of the frame sides A, one arm of which is connected by a link N' to a bar O', which is connected with the series of guide-tubes, and the other arm of which is connected to a lever P', that is pivoted to one of the frame sides A, being moved in one direction in the manner to be hereinafter described and in the opposite direction by a spring Q'.

For the twofold purpose of further protecting the solder from the heat of the irons and to prevent the chilling or cooling of the irons there is placed on each side of the furnace a shield R', of some material that is a non-conductor of heat, which is movably supported so that it may be interposed between the irons and solder when the latter are retracted and taken out of the way when the solder is to be moved into contact with the irons. Some movements of the shields are preferably automatically produced, each shield being suspended from the ends by a pair of chains S' and S', that after passing over pulleys T' and T' are fastened to the respective bars O' and O'. When the latter are moved toward the irons, they will draw on the chains, and thus lift the shields out of the path of the solder, while when said bars are moved in the opposite direction the shields will descend by gravity. The shields shown consist each of a sheet or layer of asbestos between sheet-metal plates. Certain of the pulleys T' and T' are mounted on the shafts E' and E', others, in the case of those for one shield, are placed on the shaft V, and the remainder, in the case of those for the other shield, are supported on arms $f'$ and $f'$. Upon the similar ends of the shafts E' and E' are respectively two gears $e$ and $e$, each of which meshes with one of two intermeshed gears U' and U', journaled on stub-shafts on the side of a frame A. On one of said stub-shafts and connected with one of the gears U' is a sprocket-wheel V', over which passes a sprocket-chain W', that also passes around an idler-wheel X', journaled on a stub-shaft lower down on said frame A. Pivoted to a bracket Y' on the adjacent frame A is a horizontal lever Z', having at one end a pair of jaws, one of which, $z$, is fixed and the other of which, $z'$, is pivoted, by which the chain may be gripped and through the movement thereof moved. For moving the movable jaw to cause the chain to be gripped and then moving the lever to impart movement to the chain a vertically-movable bar $A^2$ is employed, whose upper end has the form of a hook $a^2$, adapted on the descent of the bar to engage a lateral lug $z^2$ on the movable jaw $z'$. When freed from the hook, the jaw releases the chain by gravity, and the lever is returned to position for repeating the operation by a coiled spring $B^2$, that is attached at one end to the lever and at the other end to the frame A. For limiting the ascent of the jaws by the action of the spring a stop is provided, which to permit of adjustability is in the form of a vertical screw $y^2$ in a lug on the bracket Y', against which a lateral lug $z^3$ on the lever strikes. By moving the screw up or down the swing of the lever may be varied, and consequently greater or less movement of the chain secured and more or less solder fed to the irons. Should it be considered unnecessary to provide for variation in the quantity of solder fed, the bar-hook $a^2$ could engage directly with the chain, and thus the jaw-carrying lever be omitted. Vertical movement of the bar $A^2$ is secured by pivoting its lower end to a crank $C^2$ on a shaft $D^2$, connected by gears $E^2$ and $F^2$ to the driving-shaft O. Near its upper end the bar is slidably connected by a strap or loop $g$ to one arm of a lever $G^2$, pivoted to the frame. Another arm of said lever is connected by an adjustable link $H^2$ with the lever $P'$, while a third arm thereof is connected to a spring $Q^2$. By the movement of the lever $P'$, acting through the lever $G^2$, the bar $A^2$, which is continuously reciprocated by the crank $C^2$, is moved to engage its hook $a^2$ with the jaw-lug $z^2$, while by the action of the spring $Q'$ through said lever $G^2$ the bar is disengaged from the lug. Thus an intermittent movement is imparted to the sprocket-chain and from it through the gearing described to the solder-feeding devices.

The acid or flux is contained in a pan or trough $T^2$, that extends across the machine between the two frame sides A and A, being supported from the latter by brackets $a^3$ and $a^3$. Supported above it are two shafts $K^2$ and $K^2$, on each of which are mounted a series of dippers $k$ and $k$, which take from the pan the required quantity of acid for each soldering operation and deliver it to the cans. On the shafts are meshing gear-segments $k'$ and $k'$, respectively, one of which by a link or rod $k^2$ is connected to a rod or shaft $L^2$, mounted to move vertically through guides or brackets $a^4$ and $a^4$ on one of the frames A. By the ascent of the rod the shafts are rocked to tilt the dipper $k$ and $k$ to lift the acid out of the pan and deliver it to the cans, and by its descent said fingers are returned to the pan. The rod is suitably weighted, as by an enlargement $l$ on its upper end, to cause it to move to its lowest position. Mounted to turn horizontally and to move vertically in bearings on the same frame A as that on which the rod $L^2$ is mounted is a shaft $M^2$, which at its upper end has an arm $m$, that by the rocking of the shaft may be moved to or from a position beneath the lower end of the rod $L^2$. Said shaft is normally held with the arm $m$ from beneath the the rod $L^2$ by means of a coiled spring $N^2$, attached to one end of the arm $m$ or an extension thereof and to the frame A at its other end, and said shaft is moved to place the arm $m$ beneath the rod by means of a curved arm $O^2$ on the shaft, that projects in the path of the cans as the latter are moved along to place them below the acid-supplying mechanism. By lifting the shaft $M^2$ when the arm $m$ is beneath the rod $L^2$ the latter will be raised and the dipper-carrying shafts rocked to deliver acid to the cans. For moving said shaft $M^2$ vertically there is pivotally connected to its lower end one end of a lever $P^2$, whose other end is engaged by a cam $Q^2$ on the shaft $D^2$.

A tank or reservoir $R^2$, supported on a bracket on the side of the frame sides A and connected by a pipe $r$ with the pan $T^2$, supplies acid to the latter, while a second tank $S^2$, also supported on a bracket on said frame side, is provided to receive any overflow from the pan, a pipe $s^2$ being run from the latter to the tank $S^2$.

The cans to be operated on are supported in two parallel rows on a tray $T^3$, which is placed upon a horizontal bed $U^2$, that rests upon two pairs of levers $V^2$ and $V^2$ at its respective ends, said levers being pivoted to the frame sides A and A and the levers of a pair being extended in opposite directions and engaging each a rounded lug or boss $u$ on the under side of the bed $U^2$. Pivoted on the same pivot with each lever $V^2$ is a rod or bar $W^2$, the under side of which is engaged by a screw $v^2$, tapped through the lever $V^2$, and which is connected by a link $X^2$ with a lever $Y^2$, that engages a cam $Z^2$ upon the shaft $D^2$. By the revolution of said cam the bed is caused to have a rising-and-falling movement, the reason for which will hereinafter appear. By means of the bar $W^2$ and the screw $v^2$ the level of the bed can be adjusted. To confine the bed in position as it rises and falls, a bar $A^3$ is pivoted at one end to each side thereof, which at its other end is pivoted to the frame side A. Secured to the bed in position to enable it to engage a stud or projection $p$ on the lever $P'$ is an arm $u'$, which on the descent of the bed will engage said stud should the spring $Q'$ fail to act, and thus positively move the lever. To permit adjustment in view of the adjustability of the bed, the arm $u'$ is made in two parts united by a slot-and-bolt connection.

Upon the bed are two rails $B^3$ and $B^3$, upon which the tray rests and along which it may slide, and there are two guide-bars $C^3$ and $C^3$ upon the bed to engage the respective ends of the tray and hold it from endwise movement in either direction. For moving the tray there are two longitudinally-movable bars $D^3$ and $D^3$, which are placed in slots in the bed, being each grooved in one side to engage the side wall of its respective slot, and having pivoted dogs $d'$ and $d'$ to engage the edge of the tray. Said dogs are of a familiar construction which permits the tray to depress and pass over them in one direction, but resists movement in the opposite direction. A bell-crank lever $E^3$, connected at one end to the two bars $D^3$ and $D^3$ and engaged at its other end by a cam $F^3$ on the shaft $D^2$, constitutes means whereby the revolution of the cam causes the reciprocation of the bars.

On the drive-shaft O there is provided suitable clutch mechanism $G^3$, by which the sprocket-wheel N may be clutched to and unclutched from the shaft to control the revolution of the soldering-tools.

The operation of the machine is as follows: A tray containing two rows of cans is placed on the rails B³ and B³ with its edge in position to be engaged by the outermost dogs d' and d'. The bars D³ and D³, being moved by the cam F³, pass the cans to a position beneath the acid-feeding mechanism, and at the same time the cam Z moves the bed with the tray of cans thereon upward, so that they are close to the dippers. In the inward movement of the tray the cans at those ends of the rows next the arm O² engage and move the latter, and thus turn the shaft M² to place the arm m beneath the rod L², which is lifted, as hereinbefore described, by the cam Q³, acting to raise the shaft M². The acid being delivered to the cans, the bed is permitted to drop, and the bars D³ and D³, by the revolution of the cam F³, having in the meanwhile been retracted and again advanced, bringing the second set of dogs d' and d' against the tray, the forward travel of the latter is continued and the cans brought to position beneath the soldering-tools, and the elevation of the bed being repeated the can-tops are moved up to place them in contact with the soldering-tools, and at the same time by the engagement of the tray with the lever P' the solder guiding and feeding devices are operated to lift the shields R' and R', swing the tubes L' and L' to place the ends of the solder against the tools, and to feed the predetermined amount. The solder-tools having performed their work, the bed descends, permitting the lever P' to be moved by the spring Q' to remove the solder-guiding tube away from the tools, stop the feed of the solder, and lower the shields. The tray is next removed from the machine.

It will be seen that the operation of both the acid-feeding and solder-feeding mechanisms depends upon the presence of the cans or trays in the machine, and hence if the machine is run without them there will be no operation of said mechanisms, and so no loss of either acid or solder.

While the machine shown has two rows or sets of soldering-tools, it is to be understood that one row or set can be used and the number of tools varied and that other changes can be made in respect to details of construction which will involve no departure from our invention. We also wish it understood that though we prefer to control the feed of acid or flux by means of the cans we regard the use of the tray instead as within the scope of our invention, and we also consider the substitution of the cans for the tray as the means for controlling the feed of the solder as within the scope of our invention.

Having thus described our invention, what we claim is—

1. In a soldering-machine, the combination of soldering-tools, solder-delivering devices, and a shield movable to and from a position between the tools and said devices, substantially as and for the purpose described.

2. In a soldering-machine, the combination of soldering-tools, solder-delivering devices, a shield and means for moving the latter to and from a position between the tools and said devices, substantially as and for the purpose described.

3. In a soldering-machine, the combination of soldering-tools, solder-delivering devices, a shield, and automatically-operated means to move the latter to and from position between the tools and said devices, substantially as and for the purpose described.

4. In a soldering-machine, the combination of soldering-tools, solder-delivering devices, movable to and from the tools, and a rising and falling work-support that operates said devices, substantially as and for the purpose described.

5. In a soldering-machine, the combination of soldering-tools, solder feeding and guiding mechanism, means for moving the guiding mechanism to and from the tools, and a rising and falling work-support that operates said means, substantially as and for the purpose described.

6. In a soldering-machine, the combination of solder-feeding mechanism, means for operating the same, comprising a traveling band, a bar, adapted to actuate the band, means for moving the bar into and out of position for actuating the band, and means for moving the bar to cause it to move said band, substantially as and for the purpose described.

7. In a soldering-machine, the combination of solder-feeding mechanism, means for operating the same, comprising a traveling band, a band-gripping device, a bar, means for moving said bar into and out of engagement with such device, and means for moving the bar in a direction to move the band through said gripping device, substantially as and for the purpose described.

8. In a soldering-machine, the combination of solder-feeding mechanism, means for operating the same comprising a chain, a chain-engaging device, a bar, means for moving said bar into and out of engagement with the chain-engaging device, and means for moving said bar whereby it may move the chain, substantially as and for the purpose described.

9. In a soldering-machine, the combination of solder-feeding mechanism, means for operating the same comprising a chain, a chain-engaging device, a bar, means controlled by the presence of the tray for engaging said bar and chain-engaging device, and bar-operating mechanism, substantially as and for the purpose described.

10. In a soldering-machine, the combination of a frame having side pieces, a work-support, soldering-tools, and a frame carrying said tools above the work-support, and pivoted between the frame sides on a horizontal axis, substantially as and for the purpose described.

11. In a soldering-machine, the combination of a frame having side pieces, a work-support, soldering-tools, and a frame carrying said tools above the work-support, pivoted between the frame sides on a horizontal axis, a shaft and connections between the same and the tool-carrying frame for swinging said tool-carrying frame, substantially as and for the purpose described.

12. In a soldering-machine, the combination of a holder or receptacle for material to be used for soldering cans, means for moving the cans horizontally, devices for delivering said material to the cans, actuating means for said devices, and an operating device for said actuating means movable into and out of position to engage the same having a part in the horizontal path of the cans, for engagement by the cans to move said device into position to engage said actuating means, substantially as and for the purpose described.

13. In a soldering-machine, the combination of an acid or flux receptacle, dippers, and means for actuating the latter, controlled by the horizontal travel of the cans, substantially as and for the purpose described.

14. In a soldering-machine, the combination of an acid or flux receptacle, dippers, a movable work-support, means independent of the work to operate the dippers, and means actuated by the work to control the latter, substantially as and for the purpose described.

15. In a soldering-machine, the combination of an acid or flux receptacle, dippers, means independent of the work for operating the dippers, and means whereby the horizontal travel of the work controls said dipper-operating means, substantially as and for the purpose described.

16. In a soldering-machine, the combination of a device to be operated, a rotary and longitudinally-movable shaft, an arm carried by the latter adapted to be placed into and out of operative relation to said device, means to move the shaft longitudinally, and work-engaged means for turning it, substantially as and for the purpose described.

17. In a soldering-machine, the combination of an acid or flux receptacle, dippers, a rotary and longitudinally-movable shaft, an arm carried by the latter adapted to be placed into and out of operative relation to the dippers, means to move the shaft longitudinally, and work-engaged means for turning it, substantially as and for the purpose described.

18. In a soldering-machine, the combination of an acid or flux receptacle, dippers, a longitudinally-movable rod connected to the dippers, a rotary and longitudinally-movable shaft, an arm on the latter movable into and out of position in line with said rod, means to move the shaft longitudinally, and an arm by which it may be turned, substantially as and for the purpose described.

19. In a soldering-machine, the combination of an acid or flux receptacle, dippers, a longitudinally-movable rod connected to the dippers, a rotary and longitudinally-movable shaft, an arm on the latter, to coöperate with said rod, a cam-actuated lever to move said shaft longitudinally, and a can-actuated means for turning it, substantially as and for the purpose described.

20. In a soldering-machine, the combination of a frame, soldering mechanism, a bed, arms pivoted to the frame and to the bed, and means for raising and lowering the bed, substantially as and for the purpose described.

21. In a soldering-machine, the combination of soldering mechanism, a movable solder-guide, a rising and falling work-support, and a lever connected with the solder-guide and in the path of a part carried by the work-support, substantially as described.

In testimony that we claim the foregoing we have hereunto set our hands this 12th day of November, 1900.

JAMES D. COX.
FRANK A. ODIN.

Witnesses:
JOHN S. WILSON,
I. WOODFORD DAVIS.